Patented Nov. 8, 1938

2,136,016

UNITED STATES PATENT OFFICE 2,136,016

METHOD FOR MANUFACTURING SULPHUR COLORS

Simon Norman, Providence, R. I., assignor to Industrial Dyestuff Company, East Providence, R. I., a corporation of Rhode Island No Drawing. Application October 24, 1935, Serial No. 46,629

14 Claims. (Cl. 260—129)

This invention relates to an improved manufacture of sulphur colors by a new method which can be used on a large variety of intermediates that can be thionated.

In manufacturing sulphur colors from intermediates, like methyl-hydroxy-aminophenazine and substituted diphenylamines and paramidophenol and their homologs, it has been customary to employ, as thionating agents, alkali metal polysulphides or mixtures of soda ash, sodium sulphide and sulphur. I have discovered that by the use of a hot solution of certain alkylene amines and sulphur containing substances, sulphur colors are produced giving different shades and properties as compared with those obtained when using the thionating agents, which are at present being used in the manufacture of sulphur colors from these same intermediates. As a specific instance, a hot solution of diethylene diamines and sulphur, or homologs of same and sulphur will produce the above stated shades.

In the following examples, it should be understood that I am not restricted as to temperature, duration of time, or quantities used, as various shades of colors result at temperatures ranging from 110° C., or even less, up to 200° C.

It should further be understood that while these examples disclose the use of water or glycerine as the liquid medium for the thionating, other higher boiling point media can be used, such as ethylene glycol, ethyl ether of ethylene gylcol, butyl ether of ethylene glycol, and, also, the higher boiling alcohols, such as butyl, amyl, and hexyl alcohols, or a mixture of any two or more thereof.

It should, also, be understood that a wide range of sulphur color intermediates can be thionated by this method.

The alkylene amines which I use are of the higher boiling types, such as ethylene diamine, tetra ethylene triamine, penta ethylene tetramine, propylene diamine, etc., and their homologs.

*Example 1.*—35 parts, by weight, ethylene diamine are heated at 140° C. with 45 parts sulphur for two hours. 50 parts water are added and then 10 parts phenazine are added. The whole is refluxed for twenty-four hours at 115° C., the mixture is then poured into 1,000 parts water, air is blown in until the dyestuff is precipitated. The dyestuff is then filtered and dried and is now ready for use, giving a red brown shade.

*Example 2.*—35 parts, by weight, ethylene diamine are heated at 140° C. with 45 parts sulphur for two hours. 50 parts water are added and then 10 parts dinitro-para-hydroxy diphenylamine are added. The whole is refluxed for twenty-four hours at 115° C., the mixture is then poured into 1,000 parts water, air is blown in until all the dyestuff is precipitated. The dyestuff is then filtered and dried and is now ready for use, giving a blue black shade.

*Example 3.*—35 parts, by weight, ethylene diamine are heated at 140° C. with 45 parts sulphur for two hours. 50 parts glycerine are added and then 10 parts methyl-hydroxy-aminophenazine are added. The whole is refluxed for two hours at 170° C., the mixture is then poured into 1,000 parts water, air is blown in until all the dyestuff is precipitated. The dyestuff is then filtered and dried and is now ready for use, giving a red brown shade.

*Example 4.*—45 parts, by weight, tetra ethylene triamine are heated at 150° C. with 45 parts sulphur for two hours. 50 parts glycerine are added and then 10 parts paramidophenol base are added. The whole is refluxed for two hours at 180° C., the mixture is then poured into 1,000 parts water, air is blown in until all the dyestuff is precipitated. The dyestuff is then filtered and dried and is now ready for use, giving an olive drab shade.

I claim:

1. The process of manufacturing sulphur colors, which comprises heating 45 parts, by weight, of tetra ethylene triamine with 45 parts, by weight, of sulphur at a temperature of about 150° C., for a period of about two hours, adding thereto 50 parts, by weight, of glycerine and then 10 parts, by weight, of paraminophenol base, then refluxing the whole for about two hours, at a temperature of about 180° C., then pouring the mixture into 1,000 parts, by weight, of water, blowing air into the mixture until all the dyestuff is precipitated, and then filtering and drying the said dyestuff.

2. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium prepared from alkylene amine and sulphur heated together for substantially two hours at substantially 140° to 150° C., in which medium the said dyestuff intermediate is actively converted into a sulphur color.

3. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium prepared from diethylene diamine and sulphur heated together for substantially two hours at substantially 140° to substantially 150° C., in which medium the said dyestuff intermediate is actively converted into a sulphur color.

4. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium prepared from tetra ethylene triamine and sulphur heated together for substantially two hours at substantially 140° to substantially 150° C., in which medium the said dyestuff intermediate is actively converted into a sulphur color.

5. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium substantially identical with that produced by heating together for substantially two hours at substantially the range 140° C. to 150° C., an alkylene amine, sulphur and a liquid selected from a group consisting of water, glycerine, ethylene glycol, butyl alcohol, amyl alcohol, and hexyl alcohol, in which medium the said dyestuff intermediate is actively converted into a sulphur color.

6. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium substantially identical with that produced by heating together for substantially two hours at substantially the range 140° to 150° C., an alkylene amine, sulphur and higher aliphatic alcohol having more than three carbon atoms, in which medium the said dyestuff intermediate is actively converted into a sulphur color.

7. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium prepared from propylene diamine and sulphur heated together for substantially two hours at substantially 140° to substantially 150° C., in which medium the said dyestuff intermediate is actively converted into a sulphur color.

8. In a dyestuff, a sulphur color prepared from a sulphur color intermediate selected from a group consisting of amino phenols of the benzene series, amines of the benzene series, and phenazines, thionated in a medium prepared from alkylene amine and sulphur heated together for substantially two hours at substantially the range 140° to 150° C.

9. In a dyestuff, a sulphur color prepared from a sulphur color intermediate selected from a group consisting of amino phenols of the benzene series, amines of the benzene series, and phenazines, thionated in a medium prepared from a thionating agent and ethylene amine heated together for substantially two hours at substantially the range 140° to 150° C.

10. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium substantially identical with that produced by heating together for substantially two hours at substantially the range 140° to 150° C., alkylene amine and a thionating agent, in which medium the said dyestuff intermediate is actively converted into a sulphur color.

11. In a method of preparing sulphur colors from dyestuff intermediates that are thionated to produce dyes by means of thionating agents, thionating such dyestuff intermediate selected from a group consisting of amino phenols of the benzene series, amines of the benzene series, and phenazines, in a medium substantially identical with that produced by heating together alkylene amine and sulphur for substantially two hours at substantially 140° to 150° C., in which medium the said dyestuff intermediate is actively converted into a sulphur color.

12. In a dyestuff, a sulphur color prepared from a sulphur color intermediate selected from a group consisting of amino phenols of the benzene series, amines of the benzene series, and phenazines, thionated in a medium substantially identical with that produced by heating together alkylene amine and sulphur for substantially two hours at substantially the range 140° to 150° C.

13. In a dyestuff, a sulphur color prepared from a sulphur color intermediate selected from a group consisting of amino phenols of the benzene series, amines of the benzene series, and phenazines, thionated in a medium prepared from tetra ethylene triamine and sulphur heated together for substantially two hours at substantially 140° to 150° C.

14. In a dyestuff, a sulphur color prepared from a sulphur color intermediate selected from a group consisting of amino phenols of the benzene series, amines of the benzene series, and phenazines, thionated in a medium prepared from propylene diamine and sulphur heated together for substantially two hours at substantially 140° to 150° C.

SIMON NORMAN.